(12) United States Patent
Mayya et al.

(10) Patent No.: US 10,425,382 B2
(45) Date of Patent: Sep. 24, 2019

(54) METHOD AND SYSTEM OF A CLOUD-BASED MULTIPATH ROUTING PROTOCOL

(71) Applicant: Nicira, Inc., Palo Alto, CA (US)

(72) Inventors: Ajit Ramachandra Mayya, Saratoga, CA (US); Parag Pritam Thakore, Los Gatos, CA (US); Stephen Craig Connors, San Jose, CA (US); Alex Kompel, Santa Clara, CA (US); Thomas Harold Speeter, San Martin, CA (US)

(73) Assignee: NICIRA, INC., Palo Alto, CA (US)

( * ) Notice: Subject to any disclaimer, the term of this patent is extended or adjusted under 35 U.S.C. 154(b) by 245 days.

(21) Appl. No.: 15/292,129

(22) Filed: Oct. 13, 2016

(65) Prior Publication Data

US 2017/0237710 A1 Aug. 17, 2017

Related U.S. Application Data

(63) Continuation-in-part of application No. 15/097,282, filed on Apr. 12, 2016, now Pat. No. 10,135,789.
(Continued)

(51) Int. Cl.
*H04L 29/06* (2006.01)
*H04L 29/08* (2006.01)
(Continued)

(52) U.S. Cl.
CPC .......... *H04L 63/0236* (2013.01); *H04L 12/66* (2013.01); *H04L 45/24* (2013.01);
(Continued)

(58) Field of Classification Search
CPC ... H04L 63/0236; H04L 49/35; H04L 63/029; H04L 63/0281; H04L 12/66; H04L 45/42;
(Continued)

(56) References Cited

U.S. PATENT DOCUMENTS

| 7,003,481 B2 * | 2/2006 | Banka ................ G06Q 30/0601 705/26.1 |
| 8,111,692 B2 | 2/2012 | Ray |

(Continued)

FOREIGN PATENT DOCUMENTS

| EP | 1912381 A1 | 4/2008 |
| EP | 3041178 A1 | 7/2016 |

(Continued)

OTHER PUBLICATIONS

Non-Published commonly Owned U.S. Appl. No. 15/701,115, filed Sep. 11, 2017, 21 pages, Nicira, Inc.
(Continued)

*Primary Examiner* — Joseph P Hirl
*Assistant Examiner* — J. Brant Murphy
(74) *Attorney, Agent, or Firm* — Adeli LLP

(57) ABSTRACT

In one aspect, a computerized system useful for implementing a cloud-based multipath routing protocol to an Internet endpoint includes an edge device that provides an entry point into an entity's core network. The entity's core network includes a set of resources to be reliably accessed. The computerized system includes a cloud-edge device instantiated in a public-cloud computing platform. The cloud-edge device joins a same virtual routing and forwarding table as the edge device. The cloud-edge device receives a set of sources and destinations of network traffic that are permitted to access the edge device and the set of resources.

20 Claims, 10 Drawing Sheets

Related U.S. Application Data

(60) Provisional application No. 62/146,786, filed on Apr. 13, 2015.

(51) Int. Cl.
| | | |
|---|---|---|
| *H04L 12/707* | (2013.01) | |
| *H04L 12/66* | (2006.01) | |
| *H04L 12/717* | (2013.01) | |
| *H04L 12/931* | (2013.01) | |
| *H04L 12/715* | (2013.01) | |
| *H04L 12/46* | (2006.01) | |
| *G06N 20/00* | (2019.01) | |

(52) U.S. Cl.
CPC .............. *H04L 45/42* (2013.01); *H04L 45/64* (2013.01); *H04L 49/35* (2013.01); *H04L 63/029* (2013.01); *H04L 63/0272* (2013.01); *H04L 63/0281* (2013.01); *H04L 67/10* (2013.01); *H04L 67/42* (2013.01); *G06N 20/00* (2019.01); *H04L 12/4633* (2013.01)

(58) Field of Classification Search
CPC ..... H04L 45/24; H04L 63/0272; H04L 67/42; H04L 67/10; H04L 12/4633; G06N 99/005
See application file for complete search history.

(56) References Cited

U.S. PATENT DOCUMENTS

| | | | |
|---|---|---|---|
| 8,228,928 B2* | 7/2012 | Parandekar | H04L 12/2859 370/351 |
| 8,243,589 B1 | 8/2012 | Trost et al. | |
| 8,566,452 B1* | 10/2013 | Goodwin, III | H04L 63/0281 709/227 |
| 8,724,456 B1 | 5/2014 | Hong et al. | |
| 8,964,548 B1 | 2/2015 | Keralapura et al. | |
| 9,071,607 B2* | 6/2015 | Twitchell, Jr. | H04L 45/586 |
| 9,154,327 B1* | 10/2015 | Marino | G06Q 30/04 |
| 9,306,949 B1* | 4/2016 | Richard | H04L 63/0272 |
| 9,336,040 B2 | 5/2016 | Dong et al. | |
| 9,354,983 B1* | 5/2016 | Yenamandra | G06F 16/178 |
| 9,432,245 B1 | 8/2016 | Sorenson et al. | |
| 9,450,817 B1 | 9/2016 | Bahadur et al. | |
| 9,525,564 B2* | 12/2016 | Lee | H04L 12/4641 |
| 9,715,401 B2 | 7/2017 | Devine et al. | |
| 9,722,815 B2 | 8/2017 | Mukundan et al. | |
| 9,787,559 B1* | 10/2017 | Schroeder | H04L 41/5038 |
| 10,135,789 B2 | 11/2018 | Mayya et al. | |
| 10,178,032 B1 | 1/2019 | Freitas | |
| 10,187,289 B1 | 1/2019 | Chen et al. | |
| 10,229,017 B1 | 3/2019 | Zou et al. | |
| 10,326,830 B1 | 6/2019 | Singh | |
| 2002/0198840 A1* | 12/2002 | Banka | G06Q 30/0601 705/50 |
| 2003/0112808 A1* | 6/2003 | Solomon | H04L 12/4633 370/400 |
| 2003/0161313 A1* | 8/2003 | Jinmei | H04L 12/2856 370/392 |
| 2003/0202506 A1 | 10/2003 | Perkins et al. | |
| 2003/0219030 A1 | 11/2003 | Gubbi | |
| 2004/0059831 A1* | 3/2004 | Chu | H04L 41/0893 709/242 |
| 2004/0068668 A1* | 4/2004 | Lor | H04L 63/107 726/15 |
| 2005/0078690 A1* | 4/2005 | DeLangis | H04L 12/5692 370/401 |
| 2006/0114838 A1* | 6/2006 | Mandavilli | H04L 41/06 370/254 |
| 2006/0171365 A1* | 8/2006 | Borella | H04L 12/4633 370/338 |
| 2006/0182034 A1 | 8/2006 | Klinker et al. | |
| 2006/0193247 A1* | 8/2006 | Naseh | H04L 45/04 370/216 |
| 2007/0091794 A1* | 4/2007 | Filsfils | H04L 12/66 370/228 |
| 2007/0121486 A1* | 5/2007 | Guichard | H04L 45/02 370/216 |
| 2007/0260746 A1* | 11/2007 | Mirtorabi | H04L 12/66 709/238 |
| 2008/0049621 A1* | 2/2008 | McGuire | H04L 12/6418 370/236.2 |
| 2008/0080509 A1* | 4/2008 | Khanna | H04L 12/4641 370/392 |
| 2008/0219276 A1* | 9/2008 | Shah | H04L 12/4641 370/401 |
| 2009/0154463 A1* | 6/2009 | Hines | H04L 12/4645 370/392 |
| 2010/0008361 A1* | 1/2010 | Guichard | H04L 45/00 370/392 |
| 2010/0332657 A1* | 12/2010 | Elyashev | H04L 67/1002 709/226 |
| 2011/0075674 A1* | 3/2011 | Li | H04L 45/04 370/401 |
| 2011/0110370 A1* | 5/2011 | Moreno | H04L 45/04 370/392 |
| 2011/0153909 A1 | 6/2011 | Dong | |
| 2012/0008630 A1* | 1/2012 | Ould-Brahim | H04L 12/4625 370/392 |
| 2012/0157068 A1 | 6/2012 | Eichen et al. | |
| 2012/0221955 A1 | 8/2012 | Raleigh et al. | |
| 2012/0250682 A1* | 10/2012 | Vincent | H04L 12/4633 370/390 |
| 2012/0250686 A1* | 10/2012 | Vincent | H04L 12/4633 370/392 |
| 2012/0300615 A1 | 11/2012 | Kempf et al. | |
| 2013/0019005 A1 | 1/2013 | Hui et al. | |
| 2013/0021968 A1 | 1/2013 | Reznik et al. | |
| 2013/0044764 A1* | 2/2013 | Casado | H04L 12/66 370/401 |
| 2013/0051399 A1* | 2/2013 | Zhang | H04L 47/12 370/401 |
| 2013/0128889 A1 | 5/2013 | Mathur et al. | |
| 2013/0173788 A1* | 7/2013 | Song | H04L 45/02 709/224 |
| 2013/0238782 A1 | 9/2013 | Zhao et al. | |
| 2013/0258839 A1* | 10/2013 | Wang | H04L 41/0668 370/221 |
| 2013/0283364 A1 | 10/2013 | Chang et al. | |
| 2013/0329548 A1 | 12/2013 | Nakil et al. | |
| 2014/0019604 A1* | 1/2014 | Twitchell, Jr. | H04L 45/586 709/223 |
| 2014/0156823 A1 | 6/2014 | Liu et al. | |
| 2014/0219135 A1* | 8/2014 | Li | H04L 12/4641 370/254 |
| 2014/0223507 A1* | 8/2014 | Xu | H04L 63/0272 726/1 |
| 2014/0244851 A1* | 8/2014 | Lee | H04L 12/4641 709/228 |
| 2015/0016249 A1 | 1/2015 | Mukundan et al. | |
| 2015/0188823 A1 | 7/2015 | Williams et al. | |
| 2015/0334696 A1* | 11/2015 | Gu | H04L 67/1095 718/1 |
| 2015/0363733 A1* | 12/2015 | Brown | G06Q 10/06316 705/7.26 |
| 2015/0372943 A1 | 12/2015 | Hasan et al. | |
| 2016/0072669 A1 | 3/2016 | Saavedra | |
| 2016/0142373 A1* | 5/2016 | Ossipov | H04L 63/0236 713/171 |
| 2016/0164914 A1 | 6/2016 | Madhav et al. | |
| 2016/0210209 A1* | 7/2016 | Verkaik | G06F 11/2033 |
| 2016/0218947 A1* | 7/2016 | Hughes | H04J 11/00 |
| 2016/0315912 A1 | 10/2016 | Mayya et al. | |
| 2016/0359738 A1 | 12/2016 | Sullenberger et al. | |
| 2017/0012870 A1 | 1/2017 | Blair et al. | |
| 2017/0053258 A1 | 2/2017 | Carney et al. | |
| 2017/0055131 A1* | 2/2017 | Kong | H04W 4/027 |
| 2017/0064005 A1* | 3/2017 | Lee | H04L 12/4641 |
| 2017/0126564 A1 | 5/2017 | Mayya et al. | |

(56) References Cited

U.S. PATENT DOCUMENTS

| | | |
|---|---|---|
| 2017/0134186 A1 | 5/2017 | Mukundan et al. |
| 2017/0201585 A1 | 7/2017 | Doraiswamy et al. |
| 2017/0214701 A1 | 7/2017 | Hasan |
| 2017/0279717 A1* | 9/2017 | Bethers ................ H04L 45/748 |
| 2017/0310691 A1 | 10/2017 | Vasseur et al. |
| 2017/0339070 A1 | 11/2017 | Chang et al. |
| 2018/0034668 A1 | 2/2018 | Mayya et al. |
| 2018/0234300 A1 | 8/2018 | Mayya et al. |
| 2018/0270104 A1* | 9/2018 | Zheng ................... H04L 41/082 |
| 2018/0302286 A1* | 10/2018 | Mayya ................ H04L 43/0882 |
| 2018/0375744 A1* | 12/2018 | Mayya ................. H04L 43/045 |
| 2018/0375824 A1* | 12/2018 | Mayya ................. H04L 43/045 |

FOREIGN PATENT DOCUMENTS

| | | |
|---|---|---|
| WO | 2012167184 A2 | 12/2012 |
| WO | 2017083975 A1 | 5/2017 |

OTHER PUBLICATIONS

Non-Published commonly Owned U.S. Appl. No. 15/707,124, filed Sep. 18, 2017, 24 pages, Nicira, Inc.
Non-Published commonly Owned U.S. Appl. No. 15/784,404, filed Oct. 16, 2017, 21 pages, Nicira, Inc.
Non-Published commonly Owned U.S. Appl. No. 15/811,329, filed Nov. 13, 2017, 37 pages, Nicira, Inc.
Non-Published commonly Owned U.S. Appl. No. 15/838,052, filed Dec. 11, 2017, 28 pages, Nicira, Inc.
Non-Published commonly Owned U.S. Appl. No. 15/838,355, filed Dec. 11, 2017, 29 pages, Nicira, Inc.
Petition for Post-Grant Review of U.S. Pat. No. 9,722,815, filed May 1, 2018, 106 pages.

\* cited by examiner

METHOD AND SYSTEM OF A CLOUD-BASED MULTIPATH ROUTING PROTOCOL

CROSS-REFERENCE TO RELATED APPLICATIONS

This application claims priority and is a continuation of U.S. application provisional Ser. No. 15/097,282 filed on Apr. 12, 2016. U.S. patent application Ser. No. 15/097,282 claims priority from U.S. Provisional Patent Application No. 62/146,786 filed 13 Apr. 2015. These applications are hereby incorporated by reference in their entirety.

FIELD OF THE INVENTION

This application relates generally to computer networking, and more specifically to a system, article of manufacture and method of establishing a cloud-based multipath routing protocol.

DESCRIPTION OF THE RELATED ART

Referring to FIG. 5A, edge device 506 and a gateway can implement a multipath solution to deliver a reliable connection across the public Internet for outbound connections (e.g. between client 502 and server 508) initiated from the edge (e.g. edge device 506) through a gateway, as well as for their return traffic. This can include multilink bundle(s). An alternate use case can include when the network traffic is initiated from an outside source. For example, the network traffic can be initiated from the Internet to server 508 in a branch office behind edge device 506.

In an example deployment, this can be implemented by enabling a set of inbound firewall rules that allow network traffic in one or more of the wide area network (WAN) links attached to the edge device. Such an inbound connection can use a single link. For example, a session established on link A 510 may fail if link A 510 fails, and similarly for link B 512. Therefore, there is a desire to be able to support inbound connections reliably without compromising the security of the deployment.

BRIEF SUMMARY OF THE INVENTION

In one aspect, a computerized system useful for implementing a cloud-based multipath routing protocol to an Internet endpoint includes a cloud-edge device that provides an entry point into an entity's core network. The entity's core network includes a set of resources to be reliably accessed. The computerized system includes a cloud-edge device instantiated in a public-cloud computing platform. The cloud-edge device joins a same virtual routing and forwarding table as the of the edge device. The cloud-edge device receives a set of sources and destinations of network traffic that are permitted to access the edge device and the set of resources.

Optionally, the entity's core network can include an enterprise's core network or a service-provider's core network. The edge device can be a virtual machine located in a local computing system located a branch office or a customer premises. The set of resources to be reliably accessed can be a server system to be accessed by a client device via the cloud-edge device and the edge device. A rule is implemented that allows a public Internet protocol (IP) address of the client device to reach the server system via another public IP address assigned to the cloud-edge device. The other public IP address assigned to the cloud-edge device is assigned to a local-area network (LAN) side of the edge device. A client-side device can connect to the server system accessing other public IP address assigned to the cloud-edge device and does not connect to the server system by directly accessing an IP address of the server system, and wherein the client-side device securely connects to the server system over a virtual private network (VPN) to the server via the cloud-edge device. The cloud-edge device can be implemented in a public cloud service provider platform. The cloud-edge device can be set to deny any inbound network traffic by default.

Figure 1:
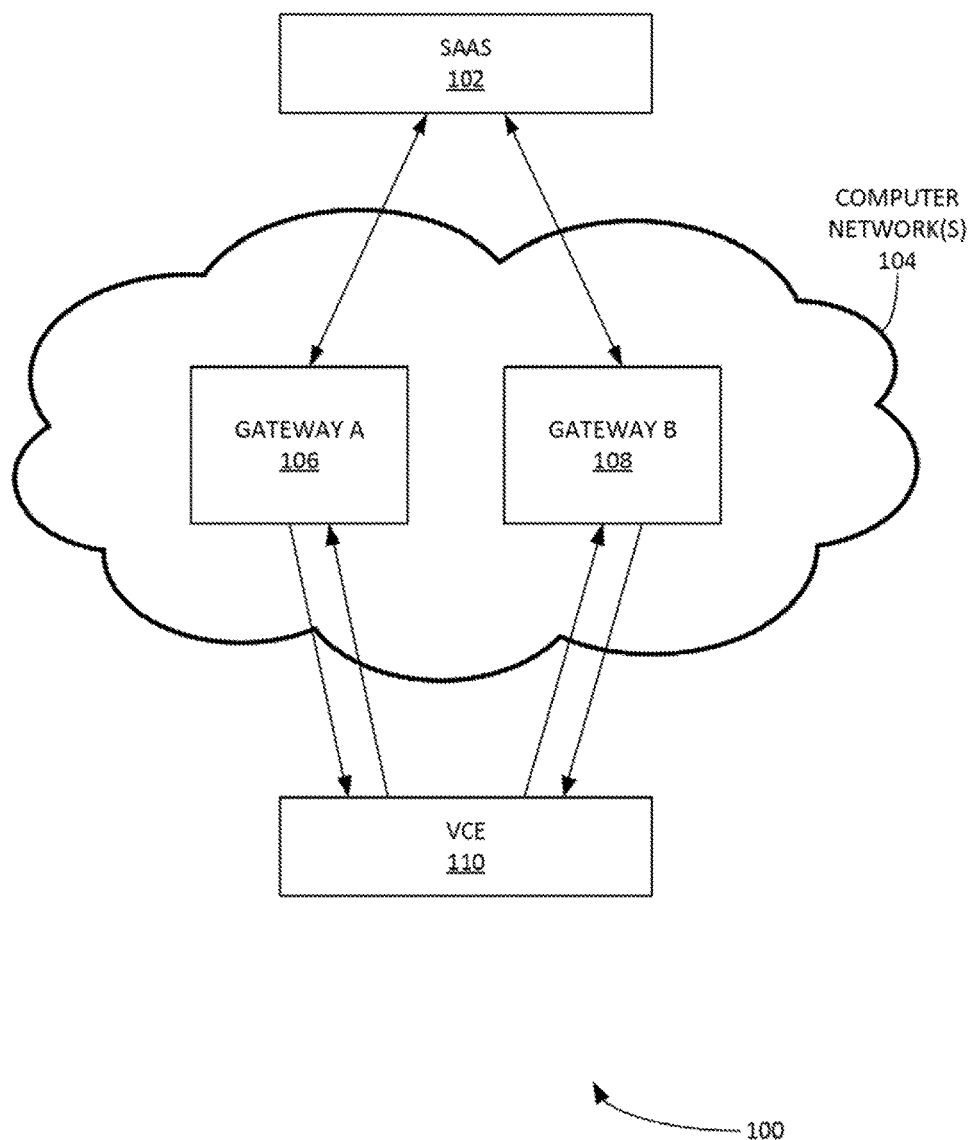
FIG. 1 illustrates an example self-healing network with redundant gateways, according to some embodiments.

The Figures described above are a representative set, and are not exhaustive with respect to embodying the invention.

DESCRIPTION

Disclosed are a system, method, and article of manufacture for establishing a cloud-based multipath routing protocol. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Cloud computing can involve deploying groups of remote servers and/or software networks that allow centralized data storage and online access to computer services or resources. These groups of remote servers and/or software networks can be a collection of remote computing services.

Cloud Edge (CE) can include a cloud multipath to an Internet endpoint.

Customer-premises equipment (CPE) can be any terminal and associated equipment located at a subscriber's premises and connected with a carrier's telecommunication channel at the demarcation point.

Edge device can be a device that provides an entry point into enterprise or service provider core networks. An edge device can be software running in a virtual machine (VM) located in a branch office and/or customer premises.

Flow can be a grouping of packets that match a five (5) tuple which is a combination of Source IP Address (SIP), Destination IP Address (DIP), L4 Source Port (SPORT) and L4 Destination Port (DPORT) and the L4 protocol (PROTO).

Forward error correction (FEC) (e.g. channel coding) can be a technique used for controlling errors in data transmission over unreliable or noisy communication channels.

Deep learning can be a type of machine learning based on a set of algorithms that attempt to model high-level abstractions in data by using model architectures, with complex structures or otherwise, composed of multiple non-linear transformations Deep Packet Inspection (DPI) can be the ability to analyze the different layers of a packet on the network.

Gateway can be a node (e.g. a router) on a computer network that serves as an access point to another network.

Internet Protocol Security (IPsec) can be a protocol suite for securing Internet Protocol (IP) communications by authenticating and encrypting each IP packet of a communication session.

Multipath routing can be a routing technique of using multiple alternative paths through a network.

Multilink bundle can be a collection of simultaneously opened bandwidth channels that are coherently and logically controlled by preset commands.

Multiprotocol Label Switching (MPLS) can be a mechanism in telecommunications networks that directs data from one network node to the next based on short path labels rather than long network addresses, thus avoiding complex lookups in a routing table.

Orchestrator can include a software component that provides multi-tenant and role based centralized configuration management and visibility.

Quality of Service (QoS) can include the ability to define a guaranteed set of actions such as routing, resource constraints (e.g. bandwidth, latency etc.).

Session can be a semi-permanent interactive information interchange between two or more communicating devices.

Software as a service (SaaS) can be a software licensing and delivery model in which software is licensed on a subscription basis and is centrally hosted.

Tunneling protocol can allow a network user to access or provide a network service that the underlying network does not support or provide directly.

Virtual Desktop Infrastructure (VDI) is a desktop-oriented service that hosts user desktop environments on remote servers and/or blade PCs. Users access the desktops over a network using a remote display protocol.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Voice over IP (VoIP) can a methodology and group of technologies for the delivery of voice communications and multimedia sessions over Internet Protocol (IP) networks, such as the Internet.

Additional example definitions are provided herein.

Scalable, Self-Healing Network Cloud Service for Branch Networking

FIG. 1 illustrates an example self-healing network 100 with redundant gateways, according to some embodiments. In network 100, data traffic can be routed to different gateways for different purposes. Multiple gateways can serve the same destination utilizing dynamic routing protocol. As services (e.g. SaaS 102) in the Internet (e.g. computer networks 104) may not centrally located. The combination of the Internet's wide distribution of services and/or changes in the transport quality across can lead to the use of different egress points to access different destinations. This is accomplished by deploying multiple gateways (e.g. gateways A-B 106-108) in stand-alone or redundant configurations.

An orchestrator can inform each edge device (e.g. VCE 110) of a list of gateways it has been assigned. Additionally, routes and/or services can be assigned a subset of the gateway list that can be used for communication with a specific destination. The edge device can then perform a static determination by metrics assigned to each gateway. For example, each gateway can be assigned a metric based on geographic distance from the edge and/or a dynamic determination based on empirically measured loss, latency and/or jitter to the gateway across the Internet.

In the redundant configuration of FIG. 1, gateways A-B 106-108 can support dynamic routing protocols on the non-edge device side. This can ensure that the gateway chosen for traffic destined from the edge to the gateway is also advertised from the gateway upstream as the route with the lowest cost for return traffic. Various attributes of gateways are now discussed.

Figure 2:
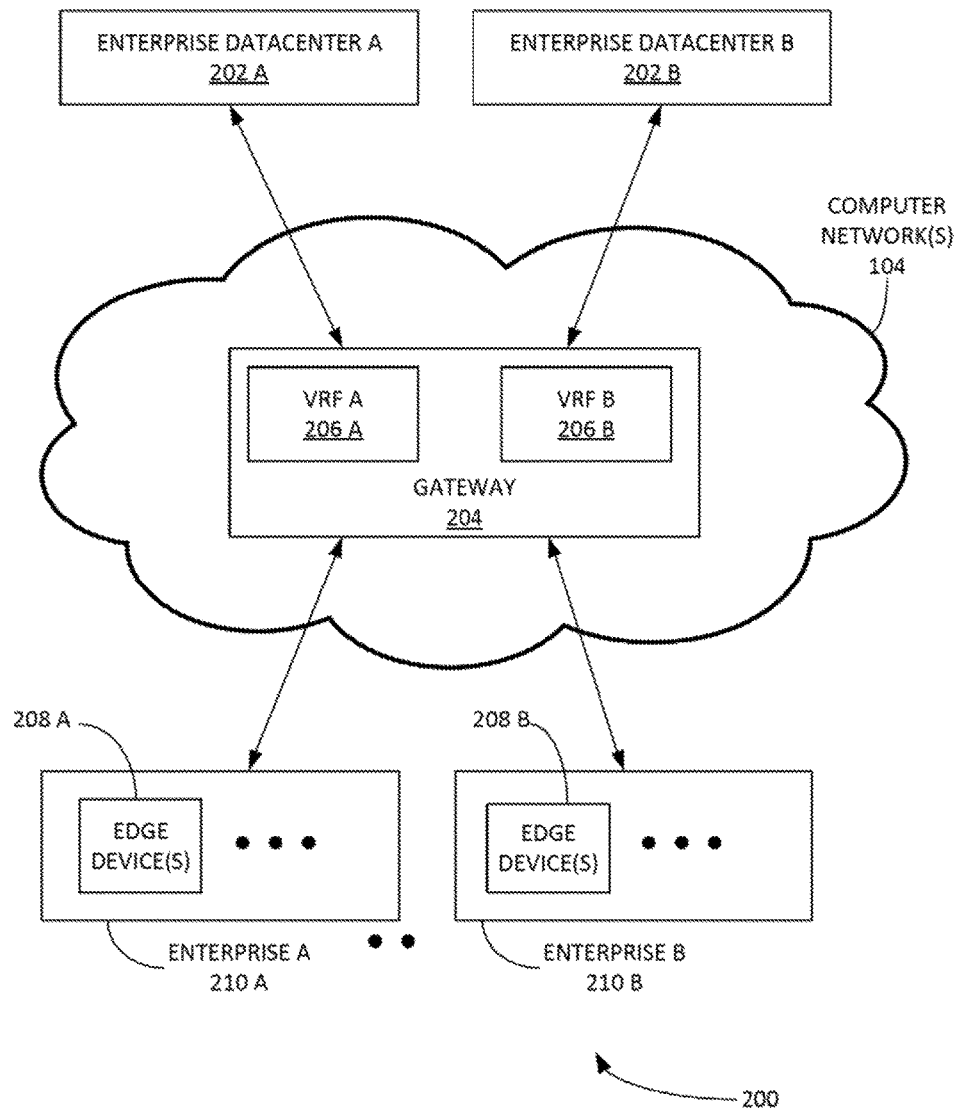
FIG. 2 illustrates an example system that includes autonomous gateways, according to some embodiments

FIG. 2 illustrates an example system 200 that includes autonomous gateways, according to some embodiments. Gateway High Availability (HA) and horizontal scalability can be inherent as configuration is edge-driven and not configured on gateway 204. Edge tunnel initialization can configure, gateway 204. Edge devices 208 A-B can communicate QoS information to gateway 204 so they have information on how to treat network traffic. Implementing versioning in the flow header can ensures that gateway 204 have the correct QoS information. This is accomplished by creating flows with a version number of one (1) on the edge and incrementing this version every time a policy change is enacted on the edge. If the gateway receives a message with a higher than expected version number in the header, it will request the edge to send the updated policy information.

It is noted that each individual gateway is a self-contained autonomous entity. This is accomplished by driving configuration of gateway 204 through the edge devices 208 A-B rather than gateway 204 being directly configured by the Orchestrator. In the initial negotiation, edge devices 208 A-B can send an MP_INIT message (e.g. an initial MP tunnel establishment handshake message exchange between the edge device and the gateway device) which contains all the information needed to identify the edge device and serve as a secure and unsecure gateway for edge device traffic. This can include a logical identifier for the enterprise which is used for virtual routing and/or forwarding. The logical identifier can also be used for subnets that are routable behind edge devices 208 A-B.

If edge devices 208 A-B is the first edge device belonging to the enterprise to connect to gateway 204, a new virtual routing and forwarding (VRF) table can be created for the enterprise. Edge devices 208 A-B's subnets can be inserted into the enterprise VRF. If edge devices 208 A-B are not the first from an enterprise to connect, the enterprise logical identifier can be used to index into the existing VRF and edge devices 208 A-B's subnets can be added to the existing table.

In another example, when a new flow is created on an edge device, the parameters used to perform QoS and/or routing on the flow can be transmitted along with the first packet to any of the gateway 204 that are handling the flow. In this manner gateway 204 can be inherently highly available. If the gateway service is removed and replaced with a new gateway service instance, edge devices 208 A-B can send a new MP_INIT which can recreate the VRF and then continue sending data traffic uninterrupted through the gateway.

By this same token, gateway 204 can be highly available because the edge can switch between gateways without interrupting customer traffic. For example, when an orchestrator inserts an additional gateway in a gateway list that can be assigned an edge device. The edge device can then connect and begin using the gateway seamlessly without any requirement for orchestrator to gateway communication. This removes the need for the orchestrator to synchronize configuration changes on the edge device and the gateway as the edge device is used as the intermediary.

In another example, a gateway need not be a single gateway instance but the Internet Protocol (IP) address may be the external facing IP address of a gateway load balancer. The gateway load balancer can start and stop individual gateway instances. If the gateway load balancers detects that an instance is near its CPU and/or throughput capacity, it can shift traffic to an alternate gateway transparently and/or create a new gateway and begin steering connections to it. When gateway reboots, upgrades or maintenance are required, the gateway load balancer can steer traffic away from those instances that require maintenance to make these operations transparent to the end user.

Figure 3:
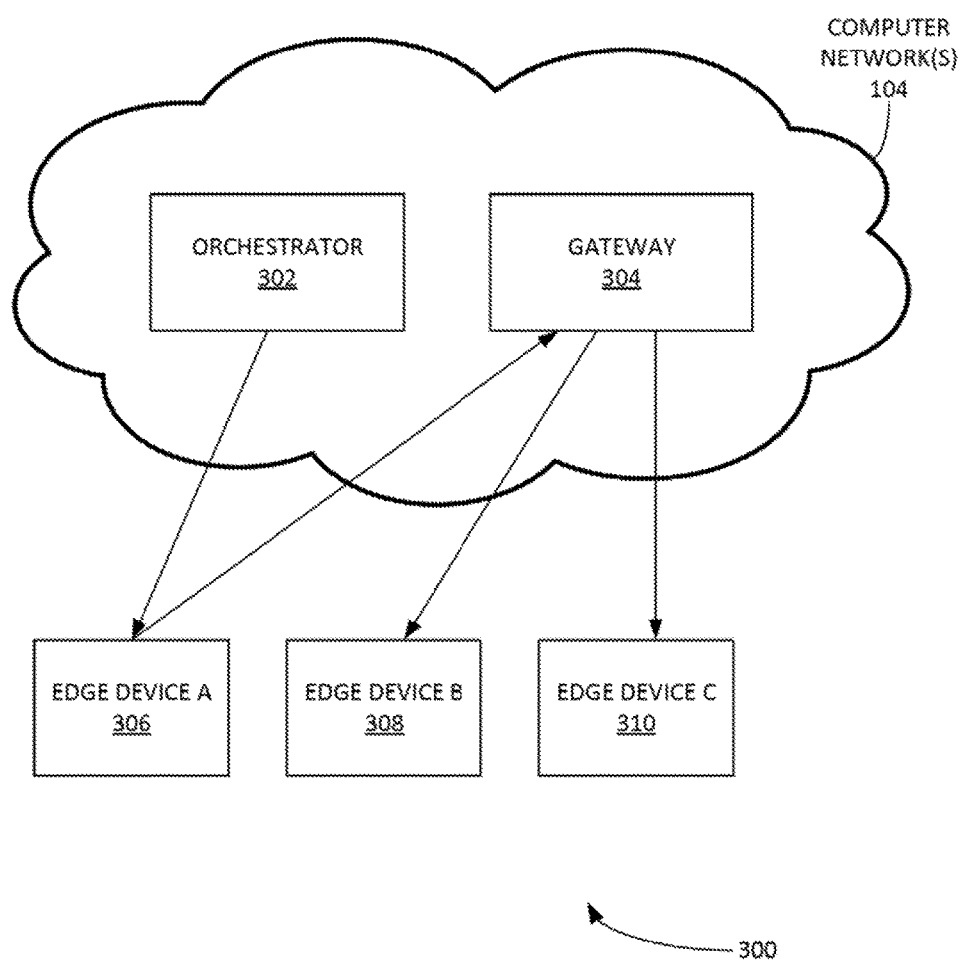
FIG. 3 illustrates an example of a system of an instant VPN, according to some embodiments.

FIG. 3 illustrates an example of a system 300 of an instant VPN, according to some embodiments. The edge device (e.g. edge devices 306-310) and gateway 304 can automatically negotiate IPsec tunnels alongside their unsecure Velocloud Multipath Protocol (VCMP) tunnels in preparation for the transmission of secure traffic. This can be performed irrespective of whether or not a VPN has been enabled on the device. In this manner, the network can be prepared to transmit secure traffic at any time. Leveraging this, an "Instant VPN" can be delivered by toggling VPN on or off on orchestrator 302. Each edge device has a list of local subnets that are sent to gateway 304 during MP_INIT. Each subnet is can include an indication of whether or not it is reachable over VPN. When VPN is enabled on orchestrator 302, each edge device can be informed that its subnets are reachable over VPN and each edge device can update its gateways with this information. When VPN is disabled on orchestrator 302, each edge device can be Informed that its subnets are not reachable over VPN. The edge device can update gateway 304 accordingly.

Between each edge device and its associated gateways can be a routing protocol. The routing protocol can relay state information to peers that are one hop away. For example, edge device A 306 can have a subnet A. Edge device B 308 can have subnet B. When the user enables VPN on orchestrator 302, edge device A 306 and edge device B 308 can inform the gateways that their local subnets A and B are reachable over VPN. The gateway(s) can then inform peers in the enterprise VRF. In this way, a message can be sent to edge device B 308 instructing it that subnet A is now reachable through it. A message can also be sent to edge device A 306 instructing it that subnet B is now reachable through it. When an edge device loses connectivity to a gateway, gateway 304 can relay to peers in the VRF that the subnet is no longer reachable and the edge device updates the routing/forwarding table to mark all routes via that unreachable gateway. In this way, gateways can be added or removed, and/or routes added and removed, without restarts and/or loss of connectivity assuming at least one gateway is connected at all times.

In some examples, "Always on" IPsec tunnels can be provided. Enable/disable VPN operations can include the insertion and/or removal of routes for the appropriate VPN zone. VRF can include enterprise logical identifier on gateway ensuring multi-tenancy.

Figure 4:
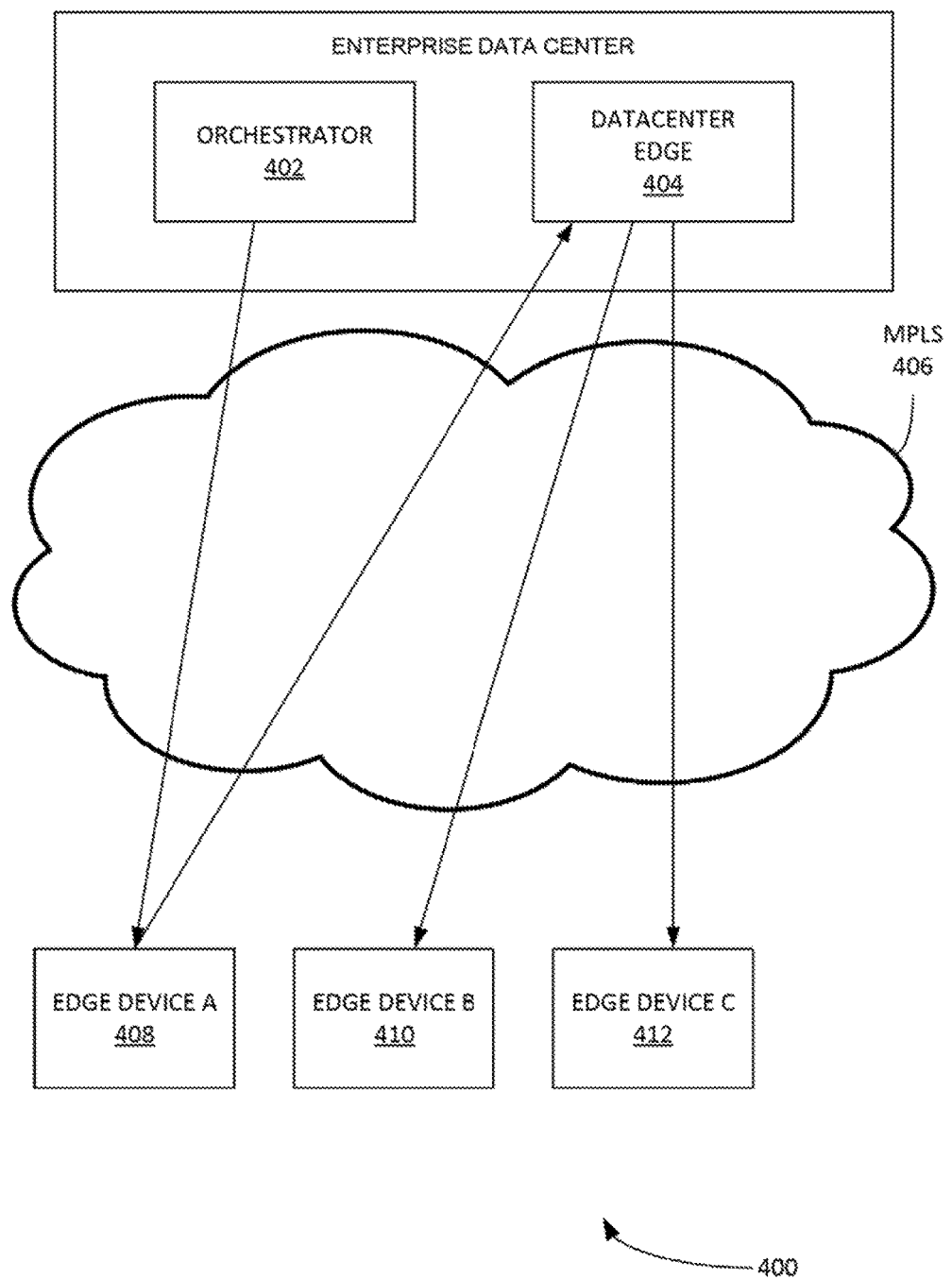
FIG. 4 illustrates another example of a system of an instant VPN, according to some embodiments.

FIG. 4 illustrates another example of a system 400 of an instant VPN, according to some embodiments. A special edge device called a Datacenter Edge (DCE) 404 can be deployed as customer premise equipment. DCE 404 can be deployed in an enterprise data center, along with orchestrator 402. DCE 404 can subsume some of the functionality of the gateway, including this route protocol management. A typical use case for this deployment can be in a pure MPLS network 406 in which there are no public Internet links and thus no public Internet gateways. In one example, route propagation can occur the same as described supra except that the VRF and routing protocol messages are managed by DCE 404. MPLS network 406 can connect with edge devices 408-412.

Figure 5A:
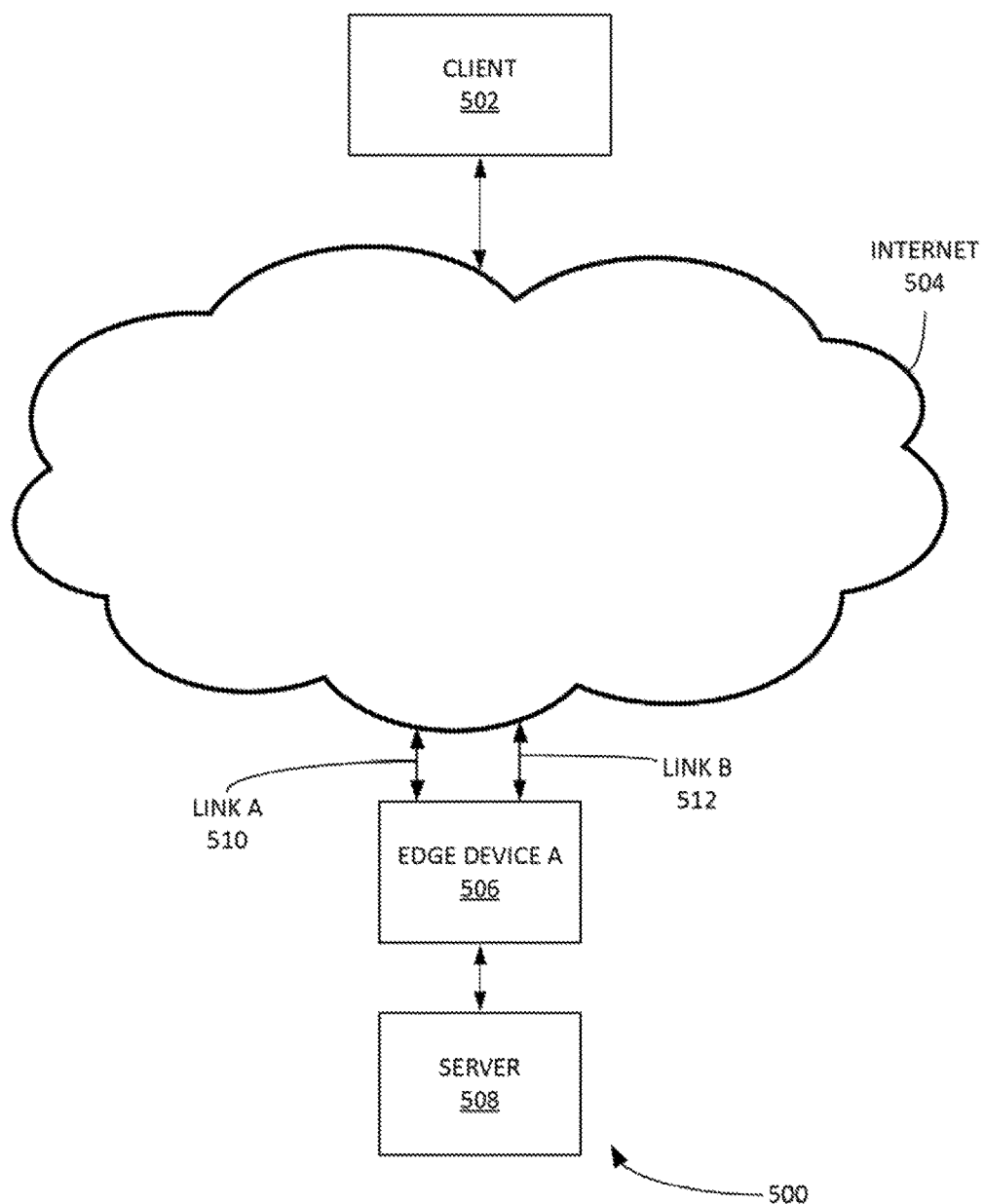
FIGS. 5 A-B illustrates an example of a system of a cloud multipath to an Internet endpoint, according to some embodiments.
Figure 5B:
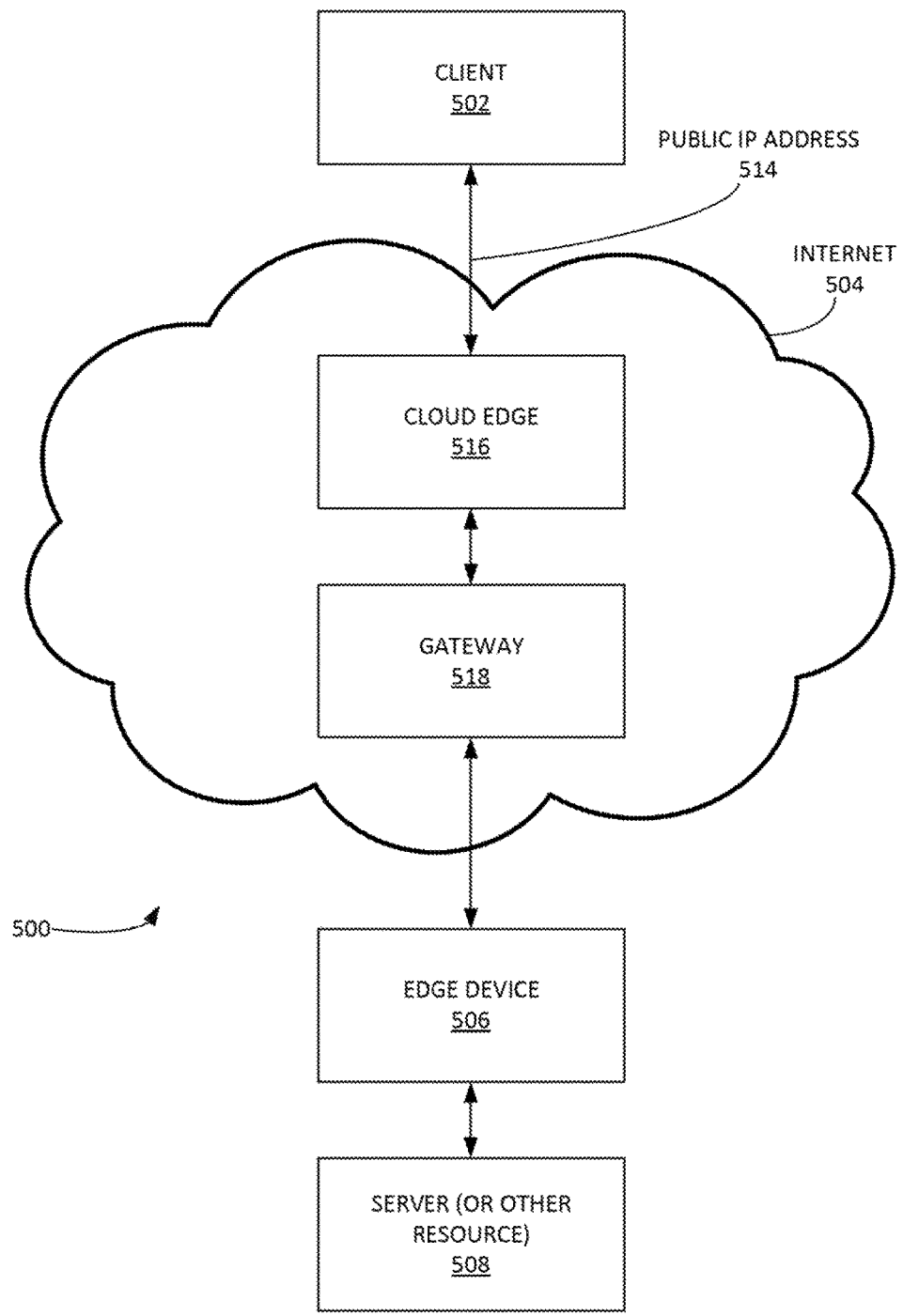

FIGS. 5 A-B illustrate an example of system 500 of a cloud-based multipath routing technique to an Internet endpoint (e.g. a cloud edge 516), according to some embodiments. Edge device 506 and gateway 518 can implement a multipath solution to deliver a reliable connection across the public Internet for outbound connections (e.g. between server 508 and client 502) initiated from the edge (e.g. edge device 506) through gateway 518, as well as for their return traffic. This can include multilink bundle(s). An alternate use case can include when the network traffic is initiated from an outside source. For example, the network traffic can be initiated from the Internet to server 508 in a branch office behind edge device 506.

In an example deployment, this can be implemented by enabling a set of inbound firewall rules that allow network traffic in one or more of the wide area network (WAN) links attached to the edge device. Such an inbound connection can use a single link. For example, a session established on link A 510 may fail if link A 510 fails, and similarly for link B 512. Therefore, there is a desire to be able to support inbound connections reliably without compromising the security of the deployment.

This can be achieved by cloud edge (CE) device 516. CE 516 can be implemented in a cloud-computing environment. CE 516 can join the same VRF as that of edge device 506.

Edge device 506 can be used to accesses various resources (e.g. server 508) to be reliably accessed. In one example, edge device 506 can be set to deny inbound traffic by default. Edge device 506 can allow an administrator to specify various sources and destinations of traffic that are permitted (e.g. client 502).

For example, a rule could be created that enable the public IP address of a client 502 to reach server 508 via a public IP address 514. Public IP address 514 can be assigned to the "LAN" side of CE 516. The administrator can then connect to public IP address 514 in the cloud rather than the IP address of one of the links at the site directly. Client 502 can then securely connect over a VPN to server 508 inside the network. CE 516 can be located anywhere in the (e.g. public) Internet 504. In one example, CE 516 can be located in any of a public Cloud Service Providers (CSPs). For example, CE 516 can be implemented in a proprietary cloud-computing platform such as, inter alia, Amazon EC2® and the like. It is noted that resources from Server 508 may arrive via Link A 510 and/or Link B 512. Accordingly, this traffic can continue even if one of the links completely fails. In this way, system 500 can provide resiliency for the network as Link A 510 and/or Link B 512 can be used simultaneously and service can continue even if one of the links fails.

An intelligent edge device (e.g. edge device 506 of FIG. 5) can provide intelligent QoS. For example, applications may respond differently to key network parameters like latency, jitter, bandwidth, packet loss and processing capabilities such as available CPU cycles. For example, a VoIP application may use low bandwidth and may be sensitive to jitter, packet loss. The VoIP application may also consume a large number of CPU cycles despite the low throughput (e.g. because of smaller packet sizes). In contrast, VDI may use high bandwidth and low latency but may not very sensitive to jitter. Accordingly, a network stack can implement a suite of link optimization and remediation technologies to achieve the dual goal of optimal network resource utilization and remediating adverse network events, such as, inter alia: FEC to compensate for packet loss; jitter buffering to counter jitter, and per-packet load balancing to aggregate bandwidth usage and ensure the lowest latency path.

Smart QoS can map application flow into a traffic class and priority queue. A combination of the traffic class and priority queue can then decide the optimal routing, load balancing and remediation to be used for that flow given the prevailing network conditions at that point of time. The network stack can use the following innovations to adapt to dynamic network conditions:

In an intelligent default, the distributed management plane (e.g. an orchestrator) sets up the edge device with a set of default QoS settings for each application. Each application can then be tagged with an SLA. The SLA can indicate a hint to the edge device for the prioritization and/or sensitivity for that particular application.

In an intelligent pre-emption, a multi-tenant, geo-diverse, network transport agnostic overlay network can be implemented. This can create a situation where the network can pre-empt adverse and/or localized network events by statistical and heuristics based analysis of the network monitoring data that is collected at the orchestrator. This can remediate certain network conditions that are not addressed by adaptive QoS (e.g. tail drops which result in large number of packets dropped indiscriminately in the core of a service provider network) due to time taken to adapt and the fact that such a loss cannot be really compensated. In a geo-localized region, in the event of constant tail drops for a network service provider, the service can proactively turn on aggressive FEC (e.g. 'always-on FEC') for sensitive applications in both the specific geo-location. In one example, a slightly larger geography for sites that are using the same provider can be used in lieu of the specific geo-location. The 'always-on FEC' can also be configured at the orchestrator in order to pre-empt network errors and react faster to network errors.

Adaptive QoS can be implemented by monitoring and/or instrumenting network paths. For example, adaptive QoS can be implemented to remediate a network condition that may not conform to the configured SLA for that application. To offset the overheads as a result of the continuous monitoring, the QoE (e.g. user responsiveness) can be periodically or constantly computed to reduce/augment the network monitoring.

Smart QoS can utilize deep learning methods. In addition to responding to dynamic network conditions, the smart QoS can work in tandem with application performance monitoring (APM) to adjust traffic priority based on L7 data. When the DPI engine fails to identify the application, the network stack can utilize statistical parameters (e.g. packet arrival rate, throughput) and heuristics (e.g. User Datagram Protocol (UDP) can be used by real-time applications) to identify the right set of technologies to provide the best performance.

A slow learning with crowdsourcing example is now discussed. Slow learning (e.g. application aware routing) with crowdsourcing methods can include generating a pre-populated list of well-known applications augmented by mid-flow detected data from DPI engine. This can enable determination of application with the first packet. Prepopulated data is automatically validated by DPI engine and any changes are fed back locally as well as communicated to the orchestrator. Some or all data can be shared to other edges/enterprises via the orchestrator. In one example, L3, L4 network information can be used to create a composite application-routing database. As used herein, L3 network information can include network layer (layer 3) information.

As used herein, L4 network information can include transport layer (layer 4) information. The application-routing database can be populated by three different types of learning/sources. The first source of information built into the database can include a pre-populated map of DIP/DPORT (Destination Internet Protocol Address/Destination Port Number) to application types (e.g. termed fast learning). A second source of information can include a map of DIP/DPORT to applications that is learned from 'mid-flow' application detection by the DPI engine (e.g. slow learning). The third source of information can also include a map of DIP/DPORT to application names. This can include crowd-sourced (e.g. DIP/DPORT to application name mapping) Information that is anonymized and aggregated at the orchestrator. This mapping can then be shared across different enterprises (e.g. crowd-sourced learning).

Various methods of populating, updating and recovering the application-routing database are now provided. The application-routing database can be pre-populated with the set of known applications that can be identified by the DIP/DPORT and/or packaged as a part of the CPE. Alternatively, it can be downloaded from the orchestrator. Additionally, an IT Administrator may enter customised DIP/DPORT to application mappings which can be added to the application routing database in the edge device via the orchestrator. This method can be a component of fast learning.

The application-routing database can also be updated by 'mid-flow' DPI detection data as a result of slow learning methods on the edge device. In addition to this, the fast learning data and slow learning updates from different enterprises can be anonymized and/or aggregated at the orchestrator. It can be sent down to all the edge device(s) under the management of the orchestrator. These updates can be part of the crowd-sourced learning methods.

An example application-routing database recovery method is now provided. When an edge device first communicates with the orchestrator, it can receive the data for pre-population of the application-routing database. This information can include any updates. Updates from slow learning and/or crowd-sourced learning can be synchronized to shared memory areas in the edge device. The updates can be recovered from service outages.

Figure 6:
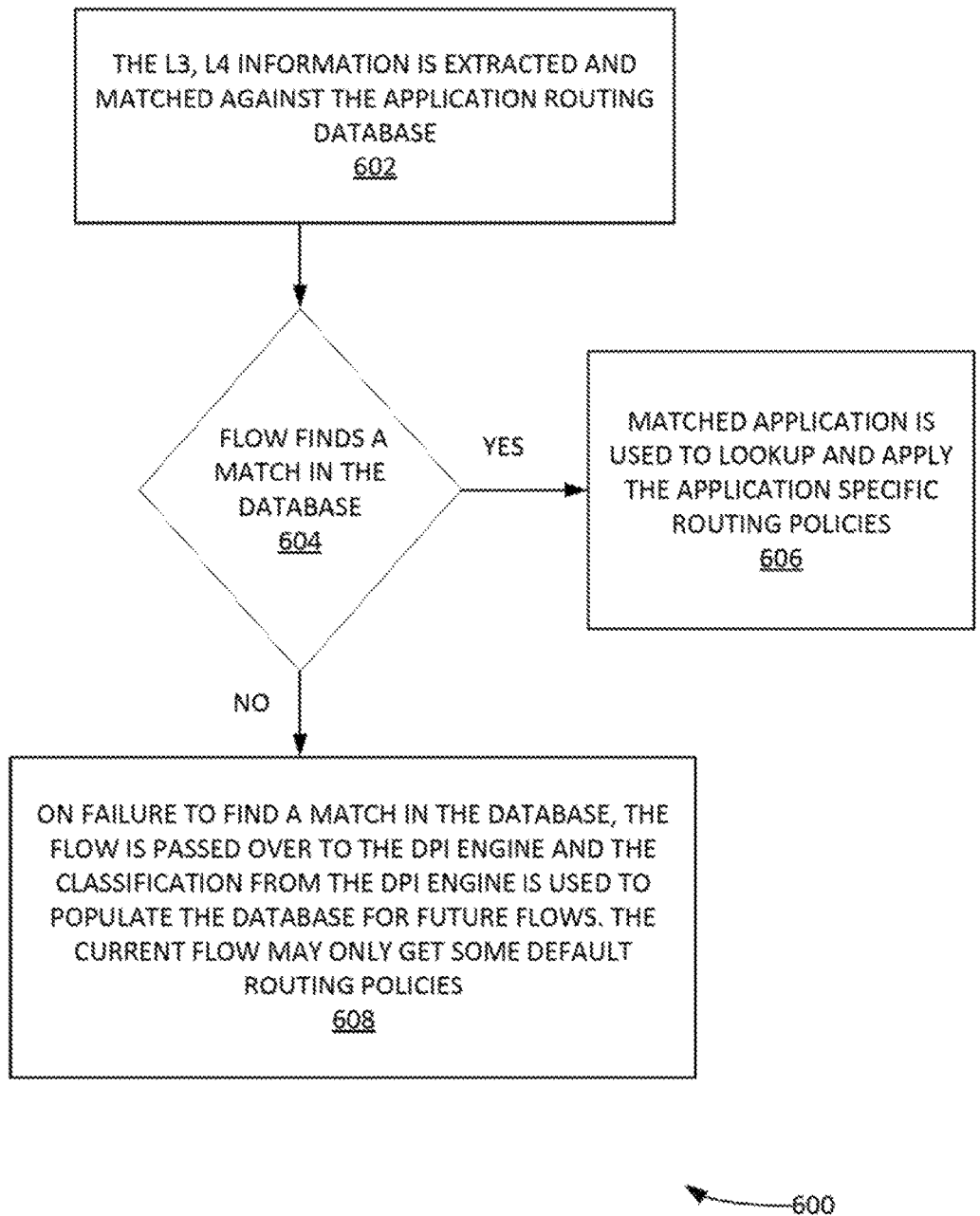
FIG. 6 illustrates an example process of an application aware routing, according to some embodiments.

FIG. 6 illustrates an example process 600 of an application aware routing, according to some embodiments. In step 602, the L3, L4 information is extracted and matched against the application routing database (e.g. database in FIG. 6). In step 604, if this flow does not find a match in the database, then process 600 moves to step 608. If 'yes', then process 600 moves to step 606. In step 606, the matched application is used to look-up and apply the application specific routing policies. In step 608, on failure to find a match in the database, the flow is passed over to the DPI engine. The classification from the DPI engine is used to populate the database for future flows. The current flow may obtain some default routing policies as well. In this way, when the same application flow is encountered again, it can find a successful match in database. The application specific routing policy can then be applied for that application flow. A worst-case guarantee of application routing from the second flow can be provided in some examples.

Figure 7:
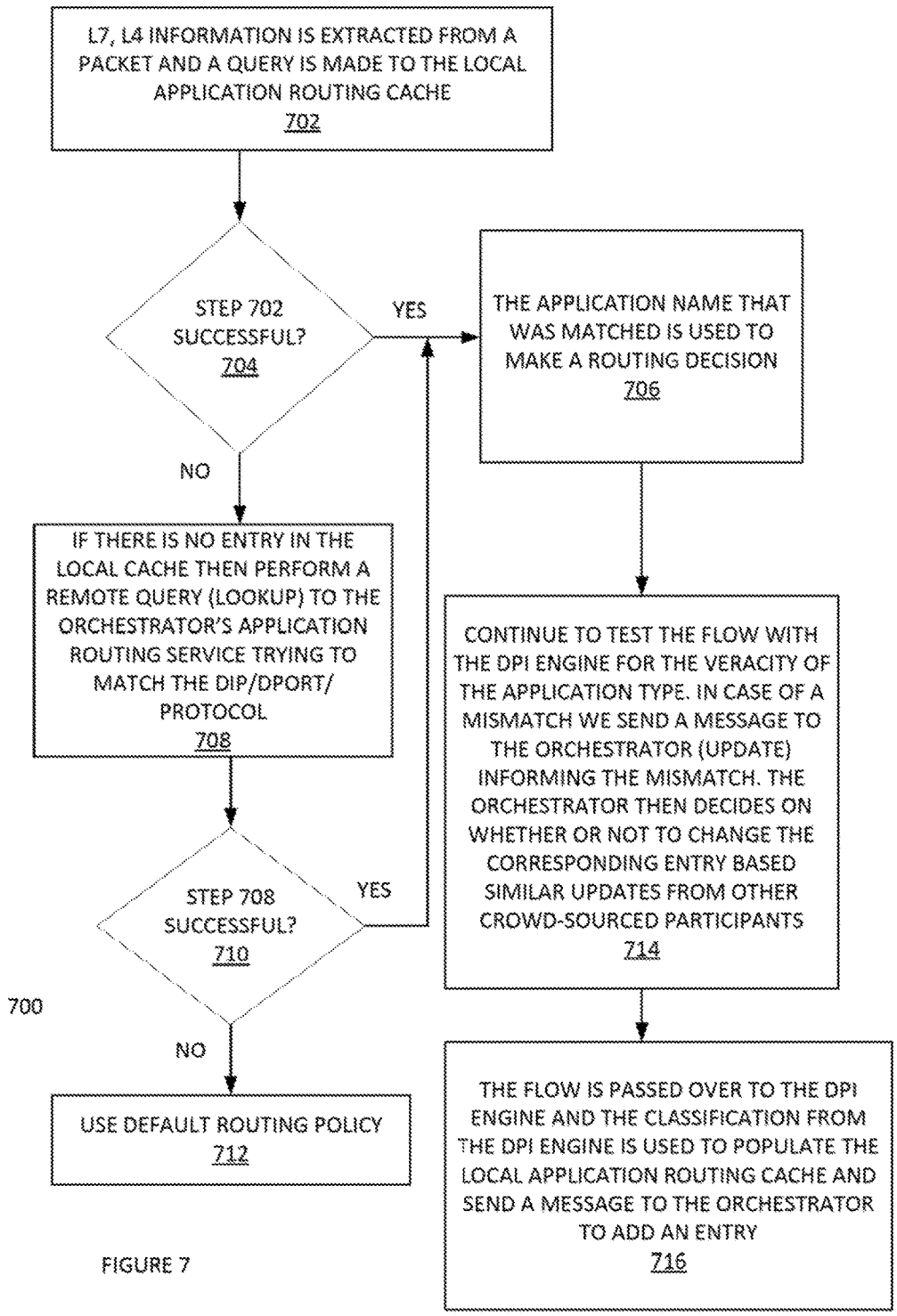
FIG. 7 illustrates another example process of an application aware routing, according to some embodiments.

FIG. 7 illustrates another example process 700 of an application aware routing, according to some embodiments. For example, in an alternative step 608, the L3, L4 information can be communicated to an application routing lookup service (e.g. can be a local service synchronized with an aggregated crowd source updated remote service running in the orchestrator like DNS). This can return the application match for the flow with a higher probability even on the first flow. In this incarnation, the application-routing database can reside in the orchestrator. The edge-device queries the application-routing database via the application routing lookup service. The edge-device can cache the responses from the lookup. Optionally, the cached entries can be expired using a TTL (Time-to-Live) value. More specifically, process 700 illustrates an example packet flow Illustration.

In step 702, the L3, L4 information can extracted from a packet and a query is made to the local application routing cache (e.g. cache lookup). In step 704, it can be determined if step 702 is successful. If 'yes', then process 700 can proceed to step 706. If 'no' then process 700 can proceed to step 708. In step 708, process 700 can perform a remote query (e.g. lookup) to the orchestrator's application routing service to match the DIP/DPORT/PROTOCOL. In step 710, it can be determined if a successful lookup was implemented in step 708. If 'yes', then process 700 can proceed to step 706. If 'no', then process 700 can proceed to step 712. In step 712, process 700 can use the default routing policy and continue to step 716 where the flow is passed over to the DPI Engine and the classification from the DPI Engine is used to populate the local application routing cache and inform the Orchestrator for future flows. In step 706, the application name that was matched is used to make a routing decision. In step 714, process 700 can continue to test the flow with the DPI engine for the veracity of the application type. In case of a mismatch, process 700 can send a message to the orchestrator (e.g. with an update operation), thus informing of the mismatch. The orchestrator can then decide on whether or not to change the corresponding entry based similar updates from other crowd-sourced participants.

Additional Exemplary Computer Architecture and Systems

Figure 8:
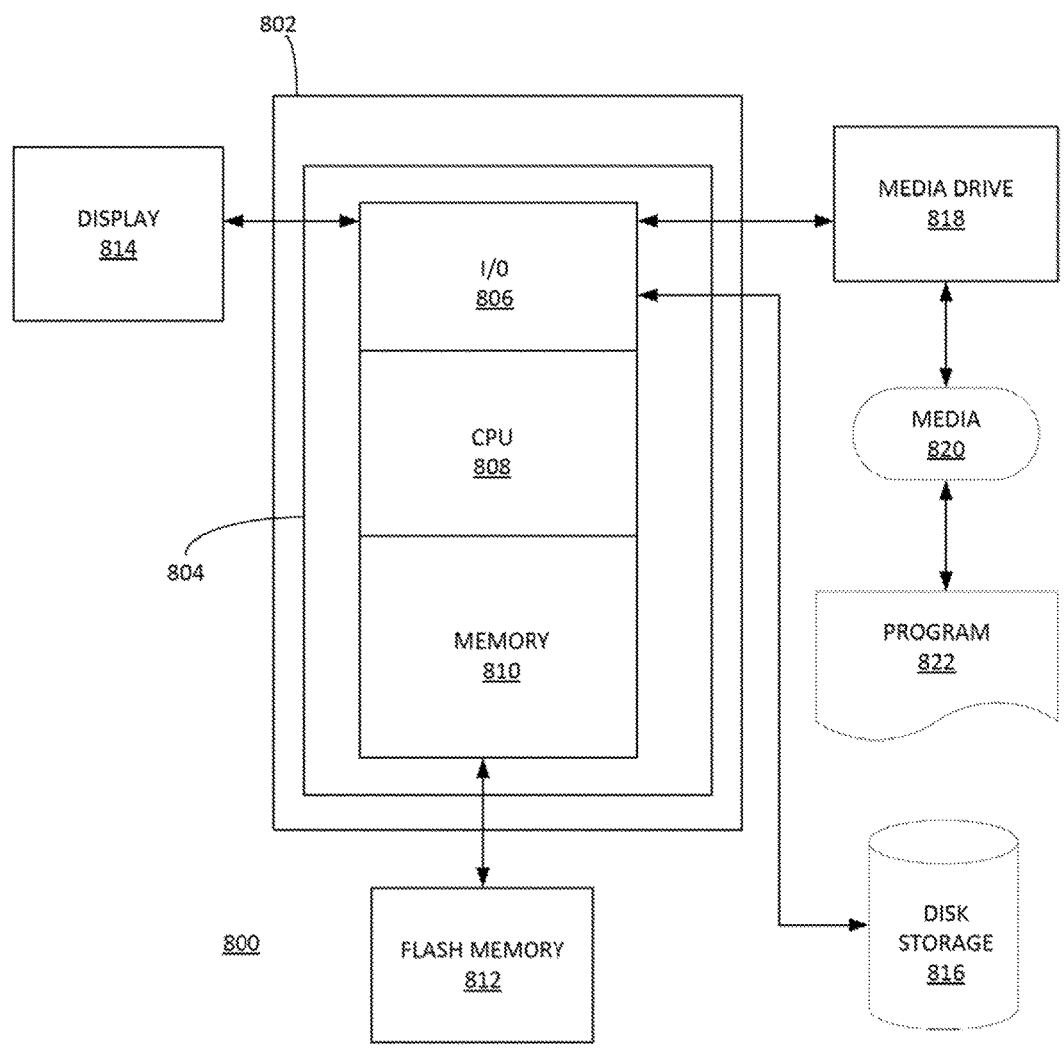
FIG. 8 depicts an exemplary computing system that can be configured to perform any one of the processes provided herein.

FIG. 8 depicts an exemplary computing system 800 that can be configured to perform any one of the processes provided herein. In this context, computing system 800 may include, for example, a processor, memory, storage, and I/O devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or other user input (not shown), a disk storage unit 816, and a media drive unit 818. The media drive unit 818 can read/write a computer-readable medium 820, which can contain programs 822 and/or data. Computing system 800 can include a web browser. Moreover, it is noted that computing system 800 can be configured to include additional systems in order to fulfill various functionalities. Computing system 800 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Additional Methods

Figure 9:
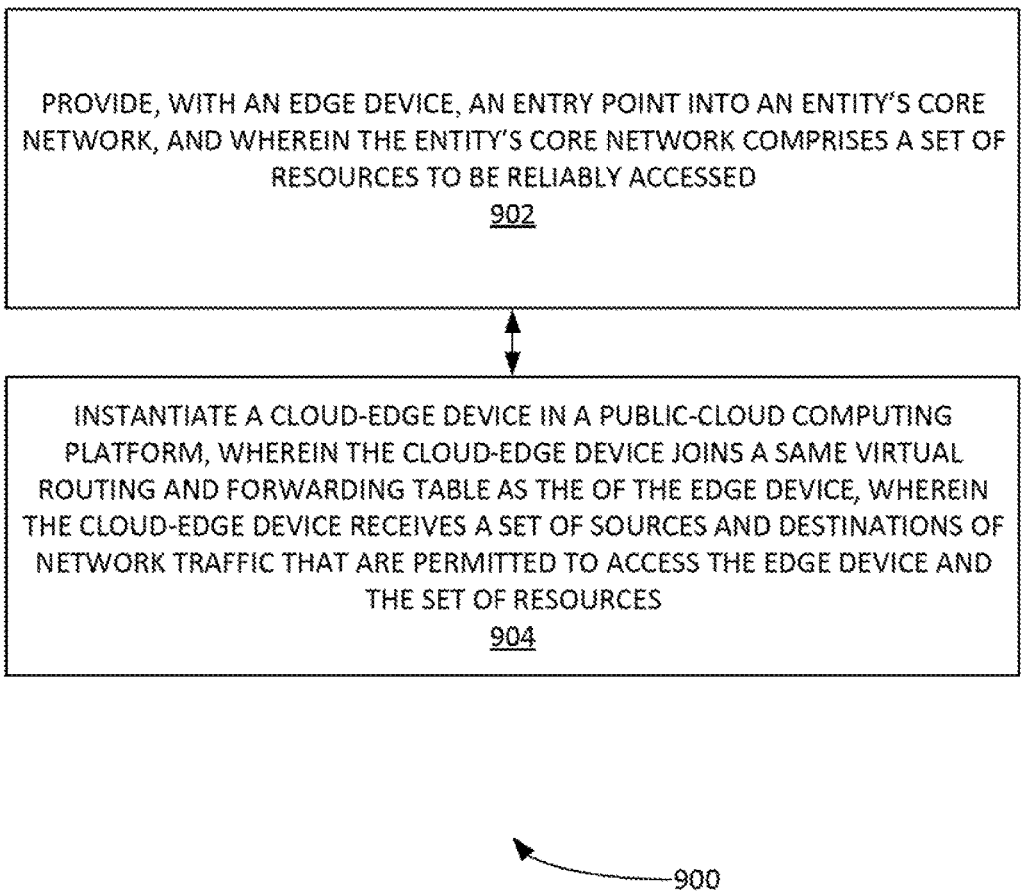
FIG. 9 illustrates an example process for implementing a cloud-based multipath routing protocol to an Internet endpoint, according to some embodiments.

FIG. 9 illustrates an example process 900 for implementing a cloud-based multipath routing protocol to an Internet endpoint, according to some embodiments. In step 902, process 900 can provide, with an edge device, an entry point into an entity's core network. The entity's core network comprises a set of resources to be reliably accessed. In step 904, process 900 can instantiate a cloud-edge device in a public-cloud computing platform. The cloud-edge device joins a same virtual routing and forwarding table as the of the edge device. The cloud-edge device receives a set of sources and destinations of network traffic that are permitted to access the edge device and the set of resources.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method for providing cloud-based multipath routing between a gateway and an edge device, the method comprising:
   at the edge device, which connects a set of resources of a core network to at least one external network:
      receiving a set of gateway configuration data comprising a set of forwarding rules and a set of access control list (ACL) rules, the set of ACL rules identifying a set of sources and destinations of network traffic that are permitted to access the set of resources; and
      transmitting the received gateway configuration data to at least a first gateway, the set of forwarding rules of the gateway configuration data for configuring first and second gateways to implement a same virtual routing and forwarding (VRF) table,
      wherein (i) the first gateway receives a first data message from a first client device, determines, based on the set of ACL rules, that the first client device is permitted to access the set of resources, and forwards, using the VRF table, the first data message to the edge device, and (ii) the second gateway receives a second data message from a second client device, determines, based on the set of ACL rules, that the second client device is permitted to access the set of resources, and forwards, using the VRF table, the second data message to the edge device, wherein the first and second client devices do not belong to the core network.

2. The method of claim 1, wherein the core network comprises one of an enterprise's core network and a service-provider's core network.

3. The method of claim 1, wherein the edge device is a virtual machine executing on a host in one of a branch office and a customer premises.

4. The method of claim 1, wherein the first and second gateways implement a cloud gateway, each gateway of the cloud gateway implementing the VRF table and associated with a same logical identifier.

5. The method of claim 4, wherein the first and second messages are addressed to a same public Internet protocol (IP) address of the cloud gateway.

6. The method of claim 5, wherein the public IP address is the IP address of a gateway load balancer of the cloud gateway.

7. The method of claim 6, wherein the first client device accesses the set of resources by accessing the public IP address assigned to the cloud gateway and does not connect to the set of resources by directly accessing an IP address associated with the set of resources, wherein the first client device securely connects to the set of resources over a virtual private network (VPN) via the first gateway.

8. The method of claim 1, wherein the first data message is forwarded to the edge device via a first link of a multilink bundle connecting the edge device to the first gateway, wherein if the first link of the multilink bundle fails, remaining links of the multilink bundle continue to provide access to the set of resources via the first gateway.

9. The method of claim 1, wherein the first and second gateways are configured to deny any inbound network traffic by default.

10. The method of claim 1, wherein the first client device and the second client device are a same client device.

11. A non-transitory machine readable medium storing a program that, when executed by a set of processing units of an edge device, provides cloud-based multipath routing, the program comprising sets of instructions for:
    at the edge device, which connects a set of resources of a core network to at least one external network:
       receiving a set of gateway configuration data comprising a set of forwarding rules and a set of access control list (ACL) rules, the set of ACL rules identifying a set of sources and destinations of network traffic that are permitted to access the set of resources; and
       transmitting the received gateway configuration data to at least a first gateway, the set of forwarding rules of the gateway configuration data for configuring first and second gateways to implement a same virtual routing and forwarding (VRF) table,
       wherein (i) the first gateway receives a first data message from a first client device, determines, based on the set of ACL rules, that the first client device is permitted to access the set of resources, and forwards, using the VRF table, the first data message to the edge device, and (ii) the second gateway receives a second data message from a second client device, determines, based on the set of ACL rules, that the second client device is permitted to access the set of resources, and forwards, using the VRF table, the second data message to the edge device, wherein the first and second client devices do not belong to the core network.

12. The non-transitory machine readable medium of claim 11, wherein the core network comprises one of an enterprise's core network and a service-provider's core network.

13. The non-transitory machine readable medium of claim 11, wherein the edge device is a virtual machine executing on a host in one of a branch office and a customer premises.

14. The non-transitory machine readable medium of claim 11, wherein the first and second gateways implement a cloud gateway, each gateway of the cloud gateway implementing the VRF table and associated with a same logical identifier.

15. The non-transitory machine readable medium of claim 14, wherein the first and second messages are addressed to a same public Internet protocol (IP) address of the cloud gateway.

16. The non-transitory machine readable medium of claim 15, wherein the public IP address is the IP address of a gateway load balancer of the cloud gateway.

17. The non-transitory machine readable medium of claim 15, wherein the first client device accesses the set of resources by accessing the public IP address assigned to the cloud gateway and does not connect to the set of resources by directly accessing an IP address associated with the set of resources, wherein the first client device securely connects to the set of resources over a virtual private network (VPN) via the first gateway.

18. The non-transitory machine readable medium of claim 11, wherein the first and second gateways are configured to deny any inbound network traffic by default.

19. The non-transitory machine readable medium of claim 11, wherein the first data message is forwarded to the edge device via a first link of a multilink bundle connecting the edge device to the first gateway, wherein if the first link of the multilink bundle fails, remaining links of the multilink bundle continue to provide access to the set of resources via the first gateway.

20. The non-transitory machine readable medium of claim 11, wherein the first client device and the second client device are a same client device.

* * * * *